US008856445B2

(12) United States Patent
Agrawal et al.

(10) Patent No.: US 8,856,445 B2
(45) Date of Patent: Oct. 7, 2014

(54) BYTE CACHING WITH CHUNK SIZES BASED ON DATA TYPE

(75) Inventors: Dakshi Agrawal, Monsey, NY (US);
Franck Le, White Plains, NY (US);
Vasileios Pappas, Elmsford, NY (US);
Mudhakar Srivatsa, White Plains, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/479,507

(22) Filed: May 24, 2012

(65) Prior Publication Data

US 2013/0318300 A1 Nov. 28, 2013

(51) Int. Cl.
*G06F 12/08* (2006.01)

(52) U.S. Cl.
USPC .................... 711/118; 711/216; 711/E12.025

(58) Field of Classification Search
USPC .................................. 711/118, 216, E12.025
See application file for complete search history.

(56) References Cited

U.S. PATENT DOCUMENTS

| 8,417,833 | B1 * | 4/2013 | Amdahl ........................ 709/247 |
| 2002/0032691 | A1 | 3/2002 | Rabil et al. |
| 2005/0235043 | A1 | 10/2005 | Teodosin et al. |
| 2006/0015618 | A1 * | 1/2006 | Freimuth et al. .............. 709/226 |
| 2006/0155819 | A1 * | 7/2006 | Grabinar et al. .............. 709/213 |
| 2007/0245090 | A1 * | 10/2007 | King et al. ..................... 711/129 |
| 2008/0285496 | A1 * | 11/2008 | Fuchs et al. .................... 370/311 |
| 2009/0055880 | A1 * | 2/2009 | Batteram et al. .............. 725/100 |
| 2009/0271528 | A1 | 10/2009 | Gurevich et al. |
| 2010/0058467 | A1 | 3/2010 | Ivory et al. |
| 2011/0131298 | A1 * | 6/2011 | Courtemanche et al. ...... 709/219 |
| 2013/0033994 | A1 * | 2/2013 | Parekh et al. .................. 370/252 |
| 2013/0150015 | A1 * | 6/2013 | Valko et al. .................... 455/418 |

OTHER PUBLICATIONS

Kruus, E. et al., "Bimodal Content Defined Chunking for Backup Systems"; (FAST'10) Proceedings of the 8th USENIX Conference on File and Storage Technologies (2010).
Ghemawat, S. et al., "The Google File System"; ACM SIGOPS Operating System Review (SOSP '03); vol. 37, Issue 5; Dec. 2003.
Niu, F., et al., "Branch and Bound: A Paradigm of Elastic Network Caching," www.pages.cs.wisc.edu/-leenn/misc/branch-n-bound/pdf. (2010).

* cited by examiner

*Primary Examiner* — Hal Schnee
(74) *Attorney, Agent, or Firm* — Ryan, Mason & Lewis, LLP

(57) ABSTRACT

Methods and apparatus are provided for performing byte caching using a chunk size based on the object type of the object being cached. Byte caching is performed by receiving at least one data packet from at least one network node; extracting at least one data object from the at least one data packet; identifying an object type associated with the at least one data packet; determining a chunk size associated with the object type; and storing at least a portion of the at least one data packet in a byte cache based on the determined chunk size. The chunk size of the object type can be determined, for example, by evaluating one or more additional criteria, such as network conditions and object size. The object type may be, for example, an image object type; an audio object type; a video object type; and a text object type.

18 Claims, 8 Drawing Sheets

BYTE CACHING WITH CHUNK SIZES BASED ON DATA TYPE

CROSS-REFERENCE TO RELATED APPLICATION

The present application is related to United States Patent Publication No. US2014/0013057, entitled "Object Type Aware Byte Caching," assigned to the assignee of the present invention, filed contemporaneously herewith and incorporated by reference herein.

FIELD OF THE INVENTION

The present invention relates generally to network data transmission techniques, and more particularly to byte caching techniques.

BACKGROUND OF THE INVENTION

Object caching techniques have been deployed to save bandwidth and to improve the download time on the World Wide Web. With object caching techniques, the server sends a requested object with certain metadata, such as cache control headers, that indicate whether the object can be stored in a cache by intermediate proxies and for how long. Many websites, however, do not mark objects as cacheable in order to attract traffic and to maintain accurate statistics. Object caching does not work when clients download only partial objects, such as videos downloaded from youtube.com, or when clients download personalized web pages. In addition, object caching techniques rely on the Uniform Resource Locator (URL) to identify a repeated download of the same object. Many popular websites, however, serve the same content with different URLs. For example, some websites assign different URLs to the same object depending on the location of the server from which the object is being served.

Byte caching techniques replace repetitive streams of application data with shorter "signatures" or "tokens" prior to transmission over the network. Byte caching techniques implement a byte cache at both ends of a network link that store byte sequences. Each byte sequence is uniquely identified by a signature. Thus, if a byte sequence has been previously transmitted, only the corresponding signature needs to be transmitted between end points. Typically, existing byte caching techniques create bytes sequences based on the number of bytes and also create a signature for each of these sequences. Therefore, a large number of byte sequences and signatures are typically generated by conventional byte caching systems, which require a large amount of computing resources.

The complexity of byte caching is largely determined by a "chunk size" parameter. This chunk size is an important parameter for the efficiency of the byte caching systems as a small chunk size improves similarity detection but increases the overhead to generate the chunks. A need therefore exists for improved techniques for determining the chunk size.

SUMMARY OF THE INVENTION

Generally, methods and apparatus are provided for performing byte caching using a chunk size based on the object type of the object being cached. According to one aspect of the invention, byte caching is performed by receiving at least one data packet from at least one network node; extracting at least one data object from the at least one data packet; identifying an object type associated with the at least one data packet; determining a chunk size associated with the object type; and storing at least a portion of the at least one data packet in a byte cache based on the determined chunk size.

The chunk size associated with the object type can be determined, for example, by evaluating one or more additional criteria, such as network conditions, object size, cache-control headers, a static degree of the data object and/or a popularity of the data object. The object type may be one or more of, for example, an image object type; an audio object type; a video object type; and a text object type. Depending on the determined object type, the data object can be divided by dividing the data object into byte sequences of a given equal length.

A more complete understanding of the present invention, as well as further features and advantages of the present invention, will be obtained by reference to the following detailed description and drawings.

DETAILED DESCRIPTION OF PREFERRED EMBODIMENTS

The present invention provides improved byte caching techniques. According to one aspect of the invention, metadata is used to improve byte caching techniques. In one exemplary embodiment, a particular chunk size is defined for each data object type. The chunk size is optionally also based on additional information, such as the size of the data object, whether the object is relatively dynamic or static, and network conditions (e.g., available bandwidth). Thus, when a packet is processed, the data object type of the packet is identified and used to determine a corresponding chunk size to apply to the packet. Aspects of the present invention recognize that larger chunk sizes will reduce the computational complexity of byte caching techniques. However, large chunk sizes may result in an increased mismatch between chunks, thereby reducing the overall effectiveness of byte caching techniques. By assigning a particular chunk size for each data object type, those data object types that are likely to have chunk matches of larger size can have larger chunk sizes. For example, it has been found that objects comprised of video or images are more likely to match with larger chunk sizes, if at all. Thus, larger chunk sizes can be assigned to objects having a video or image data object type.

As discussed hereinafter, cache control headers can be used to determine if an object is relatively static or dynamic (to determine whether an aggressive chunk size should be used). Also, an object size field in combination with a data object type can be used to determine an appropriate chunk size. An embodiment of the invention recognizes that a chunk size of 4 KB may be appropriate for a web image of size 15 KB while an exemplary chunk size of 128K may be more appropriate for a high resolution photograph of 5 MB. In a further variation, the object URL may be used to identify the object and to obtain past statistics on the usage of the object (e.g., history of past popularity and partial downloads), or to aggressively cache certain files that are obtained from certain servers (e.g., servers that pay an additional fee for faster downloads).

Another embodiment considers the available bandwidth to determine the size of the chunks. Smaller chunk sizes consume more computing resources. However, they allow the gateways to identify a larger degree of redundancy and can therefore provide higher bandwidth savings.

Operating Environment

Figure 1:
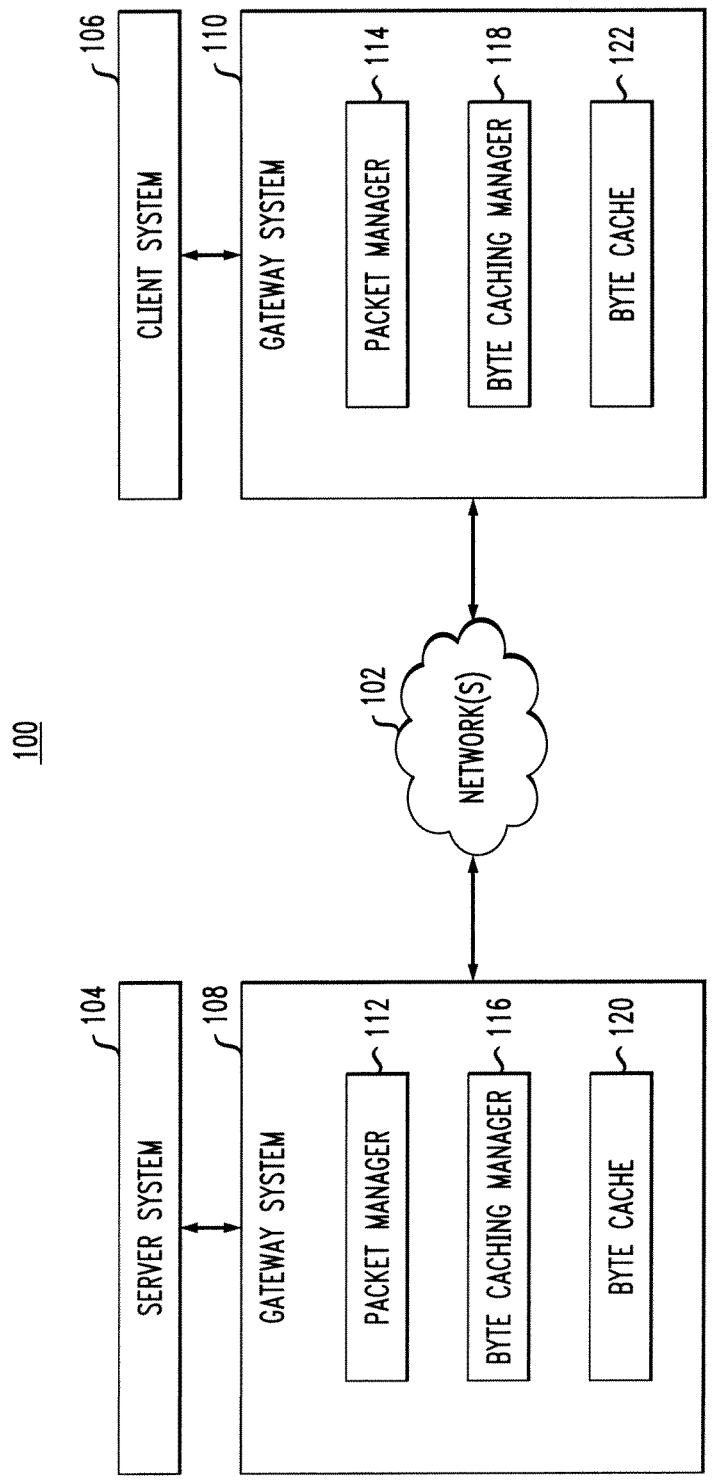
FIG. 1 illustrates an exemplary network environment where the present invention can operate.

FIG. 1 illustrates an exemplary network environment 100 where the present invention can operate. As shown in FIG. 1, the exemplary network environment 100 comprises one or more networks 102 that can include any combination of public and/or private, wired and/or wireless networks, including the Internet and Public Switched Telephone Network (PSTN). The network environment 100 also comprises a plurality of information processing systems 104, 106, 108, 110 that are communicatively coupled to the network(s) 102.

The exemplary information processing systems include one or more server systems 104, one or more client systems 106, one or more server gateway systems 108, and one or more client gateway systems 110. The server system 104 is communicatively coupled to the server gateway system 108, while the client system 106 is communicatively coupled to the client gateway system 110. The gateway systems 108, 110 act as end-point nodes that couple each of the server system 104 and client system 106, respectively, to the network(s) 102. The server system 104 and client system 106 send data packets to their respective gateway system 108, 110 any time the data packets are destined for reception by a node outside of the client/server system's private network. These packets are then forwarded to their destination via the network 102 by the gateway systems 108, 110.

In one embodiment, each gateway system 108, 110 provides a byte caching environment. For example, each gateway system 108, 110 comprises a packet manager 112, 114, a byte caching manager 116, 118, and a byte cache 120, 122. The packet manager 112, 114 manages the reception and transmission of data packets at the gateway system 108, 110. The byte caching manager 116, 118 manages byte caching operations at the gateway system 108, 110. The byte cache 120, 122 is a memory cache or any other type of storage component that stores byte sequences of data objects within data packets and their signatures.

Figure 2:
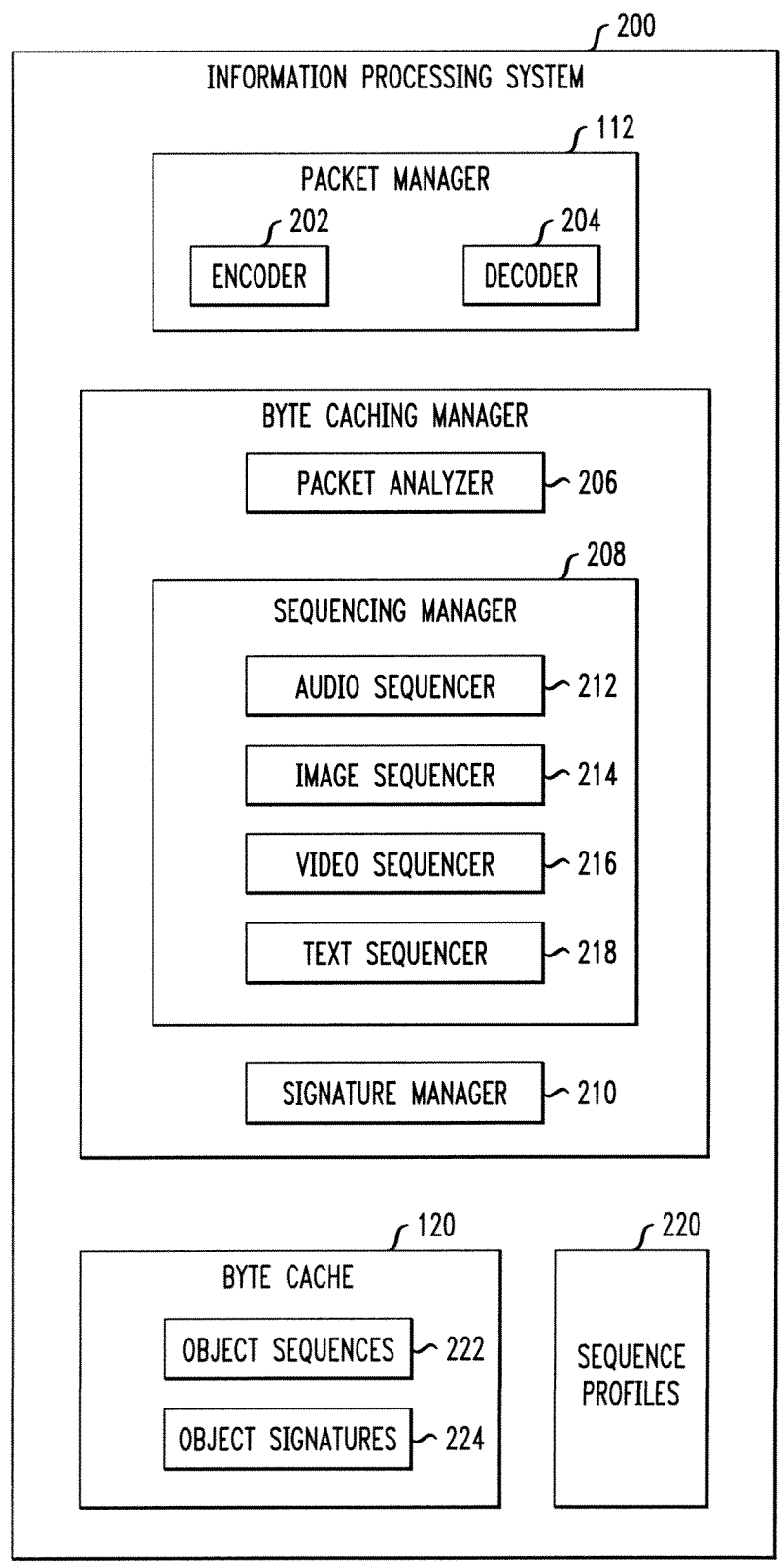
FIG. 2 is a block diagram illustrating a detailed view of an object type aware byte caching system according to one embodiment of the present invention.

FIG. 2 shows a more detailed view of a system 200 such as the server gateway system 108 or the client gateway system 110. It should be noted that embodiments of the present invention are not limited to gateway systems, as would be apparent to a person of ordinary skill in the art. Any type of information processing system that is capable of performing byte caching operations is applicable to embodiments of the present invention. In particular, FIG. 2 shows that, in one embodiment, the packet manager 112 comprises an encoder 202 and a decoder 204. The encoder 202 encodes data packets for transmission to a destination node. The decoder 204 decodes packets received by the gateway system 200 for processing thereof. It should be noted that packet manager 112 can also include any other hardware and/or software for receiving, sending, and managing data packets.

The byte caching manager 116, in one embodiment, comprises a packet analyzer 206, a sequencing manager 208, and a signature manager 210. As discussed further below, the packet analyzer 206 extracts data objects from data packets received in a byte stream and analyzes the data objects to identify the type(s) of the data object(s). Examples of data object types are audio data objects, image data objects, video data object, and text data objects. A data packet can include multiple byte streams that include one or more of these data object types.

According to one aspect of the invention, a particular chunk size is defined for each data object type. As discussed further below, the data object type can be determined from the request header (e.g., from the HTTP header of the HTTP request sent from the client 106 to the server 104). Then, all subsequent packets corresponding to the object can be identified by the IP headers (Source IP address, Destination IP address, Source Port Number, Destination Port Number, Protocol) of the packets sent from the server 104 to the client 106.

The sequencing manager 208 extracts the byte sequences for each data object of a given type identified by the packet analyzer 206 and identifies the type of data object therein. The sequencing manager 208 then utilizes one or more sequencing modules associated with the type of data object that has been identified to divide/partition the data object into a plurality of byte sequences 222 (also referred to as "chunks" or "object sequences"). Stated differently, a data object is divided into one or more byte sequences having a chunk size based on the object type of the data object being transmitted. For example, the sequencing manager 208, in one embodiment, comprises an audio sequencer 212, an image sequencer 214, a video sequencer 216, and a text sequencer 218. The sequencing manager 208 utilizes the audio sequencer 212 to sequence an audio data object. The image sequencer 214 is utilized to sequence an image data object. The video sequencer 216 is utilized to sequence a video data object. The text sequencer 218 is utilized to sequence a text data object. It should be noted that instead of using multiple sequencers a single sequencer can be utilized to perform various sequencing operations based on the type of data object of a data packet.

For a more detailed discussion of how each data object type is sequenced, see related U.S. patent application Ser. No. 13/479,689, entitled "Object Type Aware Byte Caching," assigned to the assignee of the present invention and incorporated by reference herein.

Each of these sequencers 212, 214, 216, 218 perform their sequencing operations according to a set of sequencing profiles 220 to determine how to sequence the given data object. In one embodiment, the sequencing profiles 220 indicate how a data object is to be sequenced based on its data object type. For example, the sequencing profiles 220 can indicate a chunk size for each data object, based on its data object type. These sequencing profiles 220 are updatable and can be stored separate from or within the sequencers 212, 214, 216, 218. In another embodiment, the sequences 212, 214, 216, 218 are hardcoded with sequencing instructions. The signature manager 210 calculates a signature or fingerprint 224 for each object sequence 222 created by the sequencers 212, 214, 216, 218. The signature/fingerprint 224 can be a hash value or any other data that can uniquely identify the object chunk. The byte cache 120 stores the object sequences 222 and/or the signatures 224 of the sequences 222.

Object Aware Byte Caching

Figure 3:
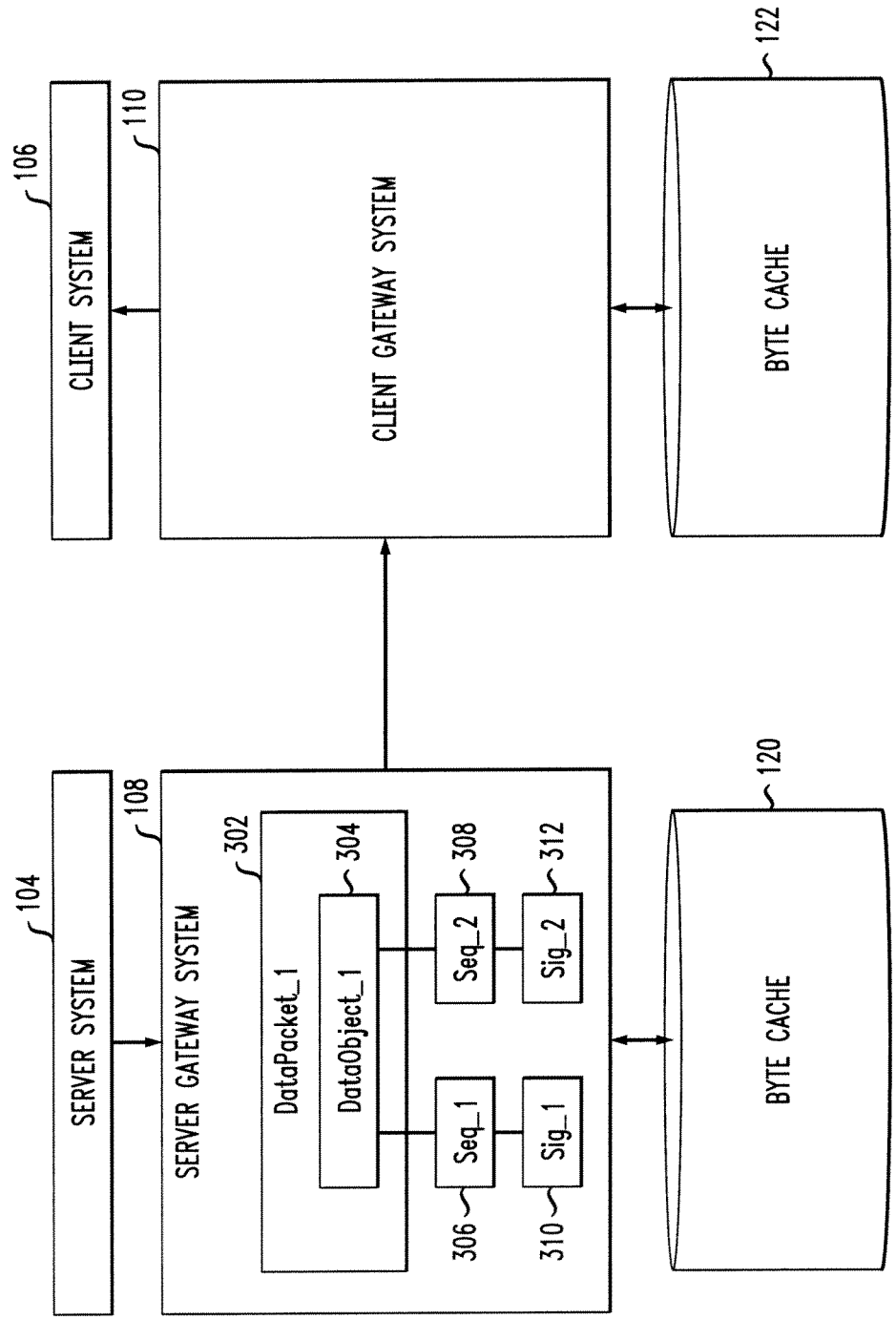
FIGS. 3-6 are block diagrams illustrating one example of object type aware byte caching according to one embodiment of the present invention.

As previously indicated, the gateway systems 108, 110 provide a byte caching environment. In one embodiment, the byte caching managers 116, 118 of the systems 108, 110 perform object type aware byte caching as illustrated below. For example, FIG. 3 shows that the server gateway system 108 receives a data packet 302 (e.g., an internet protocol packet), DataPacket_1, from the server system 104 that is destined for reception by the client system 106. The packet manager 112 of the server gateway system 108 processes the packet 302 and passes its payload (i.e., packet data without any protocol headers) and optionally header information to the byte caching manager 116. The packet analyzer 206 of the byte caching manager 116 analyzes/inspects the payload and optionally the header information to determine the object type of the data object(s) 304 within the payload. In one embodiment, the packet analyzer 206 identifies the object type by analyzing various characteristics of the data object(s) 304 within the payload and optionally information from the packet headers (e.g., TCP IP header, HTTP header, etc.). As discussed hereinafter, once the object type of the packet 302 (or of each object within the packet 302) is identified, a corresponding chunk size is determined, which is used to divide the packet 302 into chunks of a given size. As indicated above, the chunk size is optionally also based on additional information, such as the size of the data object, whether the object is relatively dynamic or static, and network conditions (e.g., available bandwidth). It is noted that byte sequences 222 could be identified across multiple packets. In other words, a stored byte sequence 222 is not limited to bytes contained within one packet.

Identifying Object Types within a Data Packet

In one exemplary embodiment, the object type may be identified as follows. After the successful establishment of a Transmission Control Protocol (TCP) connection, the client system 106 has a communication session with the server system 104 and the client system 106 can send a request for the desired content to the server 104. For example, the request message may be an HTTP Request message. In such a case, the exemplary request message contains a request line, e.g., GET /images/picture123.png HTTP/1.1, that specifies the object (picture123.png) that the client 106 wants to download from the server 104. From the file extension (e.g., png), both the Client Gateway System 110 and the Server Gateway System 108 can identify the type (e.g., image) of the object. Other protocols including Simple Mail Transfer Protocol (SMTP), Real-Time Transport Protocol (RTP), and Session Initiation Protocol (SIP) also have a content type field—also referred to as a Multipurpose Internet Mail Extensions (MIME) Type—whose value serves to identify the type of the object (e.g., text/html, image/jpeg).

All subsequent IP packets sent from the server 104 are processed by the determined module (e.g., png sequencer). As an object may be fragmented and sent over multiple IP packets, after detection of the object type (e.g., from the HTTP header), the 4 tuple (Source IP address, Destination IP address, Transport Protocol, Source Port Number, Destination Port Number) of each IP data packet identifies a flow, and all data packets corresponding to that flow are typically processed by the determined module, until termination of the TCP connection.

Based on this analysis/inspection process, the packet analyzer 206 can determine the object type of the data object(s) 304 within the received packet 302. For example, the packet analyzer 206 determines that the received data packet 302 comprises one or more audio, image, video, and/or text data objects.

Once the object type of the data object 304 within the packet 302 is identified the sequencing manager 208 selects the appropriate sequencing module for performing one or more sequencing operations on the data object 304, as discussed above. In the current example, the exemplary data object 304 is an image data object. Therefore, the sequencing manager 208 selects the image sequencer 214 to perform sequencing operations on the data object 304 that are specific to image data object types. As discussed above, these object type specific operations can be identified within the sequencing profiles 220 and/or hardcoded into the sequencers. The exemplary image sequencer 214 then divides/partitions the data object 304 into a plurality of byte sequences 306, 308 (e.g., sections/chunks), using the chunk size defined for the determined data object type.

The following describes an example of two video objects where because of additional characteristics (e.g., video rate, network available bandwidth), different chunk sizes are selected for each video:

The first object may comprise a 128 kbits/second streaming video sent from the server 104 to the client 106. Between the two byte caching gateway systems 108, 110, the resources may be limited to 130 kbits/second. The video may already be compressed. As such, the gateways 108, 110 should select as large a size as possible for the chunk size to reduce the computational requirements. However, selecting a large chunk size, such as 512 kbits, would require the gateway server system 108 to first accumulate 512 kbits in a local buffer. This requirement would create unacceptable delay to the client 106. As such, given the object type (encoded video), the rate of the video (e.g., 128 kbits/second), and the available bandwidth between the two gateways, the chunk size may be selected to be 128 kbits.

In contrast, consider a second object that comprises a 1024 kbits/s streaming video sent from a server 104 to a client 106, with an available bandwidth of 2048 kbits/s between the byte caching gateway systems 108, 110. Given such characteristics, a chunk size of 1024 kbits can be selected.

Sequencing a data object based on its object type (and possibly additional criteria) allows for larger byte sequences to be created than conventional byte caching techniques. This allows for less signatures/fingerprints to be generated, thereby saving valuable computing resources. For example, conventional byte caching methods runs a sliding window hash (covering for example 40 bytes) over the data. When the k-lowest order bits of the hash are zero, a chunk boundary is defined. As such, the value of k determines the expected chunk size. For a data packet of 8000 bytes, 8000 hashes must be computed, and depending of the value of k, a significant number of signatures may also be generated. Also, existing systems select one chunk size for all object types.

The byte caching manager 116 of one or more embodiments of the present invention creates byte sequences based on the object type of the data object within the data packet. Thus, the disclosed byte caching manager 116 can create larger sequences based on the structure of the data object. This allows the byte caching manager 116 to create a much smaller number of byte sequences and signatures. For example, the imaging sequencer 214 can be configured to sequence an image object type into two byte sequences of equal length. Therefore, if the data object is composed of 8000 bytes the imaging sequencer 214 sequences the data object into two byte sequences each having a length (or chunk size) of 4000 bytes. Therefore, since the data object is divided into two parts, only two signatures are required as compared to the 8000 hashes and many signatures with conventional systems.

Once the sequencer 214 has divided/separated the data object into a plurality of byte sequences 306, 308, based on the object type, the signature manager 210 calculates a signature/fingerprint 310, 312 for each of the byte sequences. As discussed above, a signature/fingerprint can be a hash value or any other data that can uniquely identify the object chunk.

The byte caching manager 116 then compares the byte sequences 306, 308 to byte sequences stored in the cache 120 to determine if these byte sequences have been previously received and transmitted to the client system gateway 110.

As discussed further below in conjunction with FIG. 7, if a match exists in the cache 120, this indicates that these byte sequences have been previously received and transmitted to the client system gateway 110. A match also indicates that the byte sequences 306, 308 are stored within the byte cache 122 of the client system gateway 110 since it is part of the same byte caching environment as the server system gateway 108. If the byte cache 120 at the server gateway system 108 does not comprise the byte sequences 306, 308 this indicates that these byte sequences have not been previously received by the sever system gateway 108.

Figure 4:
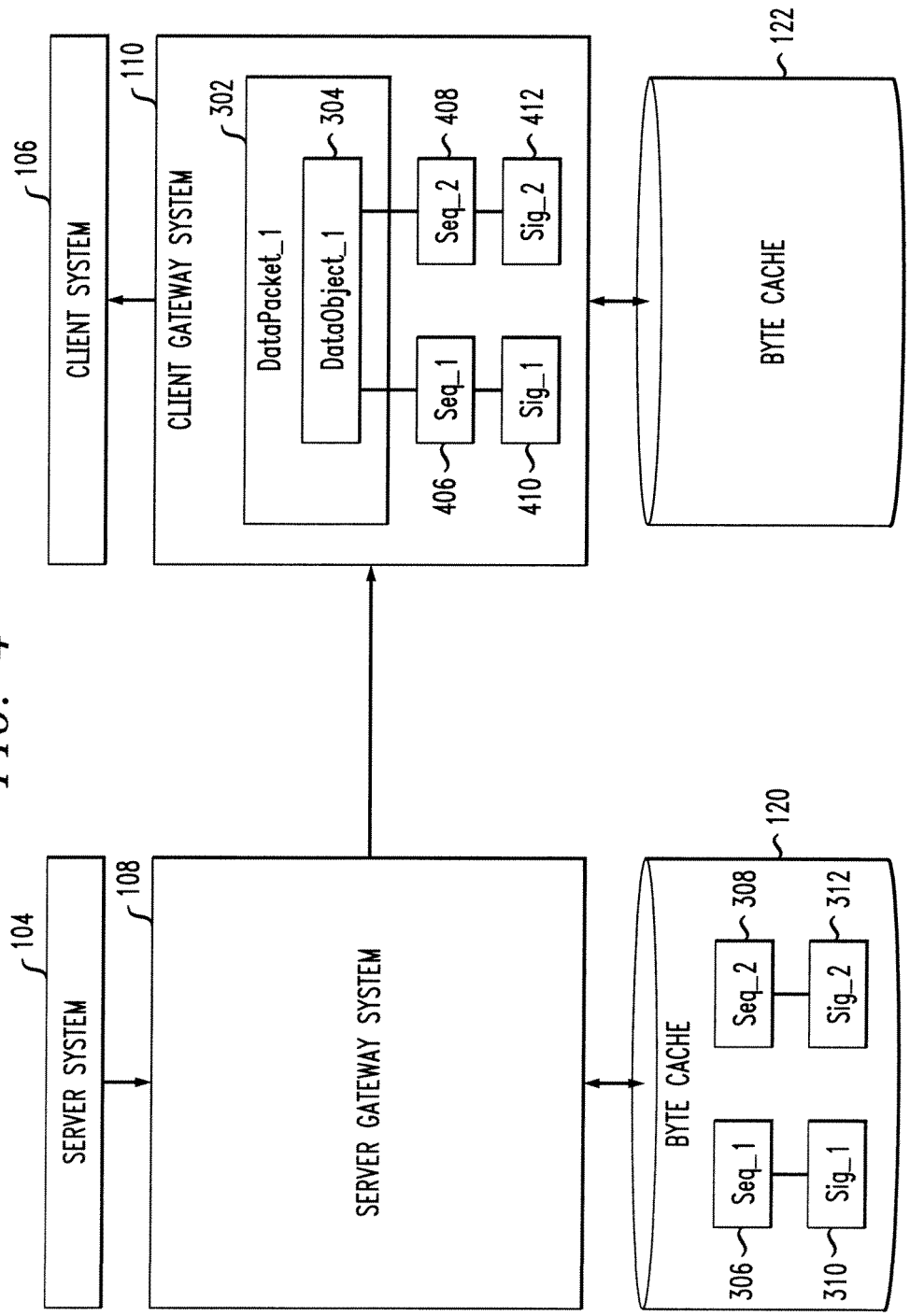

In the example of FIG. 3, the byte caching manager 116 does not identify the byte sequences 306, 308, in the cache 120. Therefore, the byte caching manager 116 determines that these byte sequences have not been previously received and transmitted to the client gateway system 110. The byte caching manager 116 stores the byte sequences 306, 308 and their signatures 310, 312 within the byte cache 120 as shown in FIG. 4. In an alternative embodiment, only the signatures 310, 312 are stored within the byte cache 120. The package manager 202 of the server gateway system 108 then transmits datapacket_1 302 to the client gateway system 110, as shown in FIG. 4. In one embodiment, the byte caching manager 118 of the client gateway system 110 analyzes the data packet 302 to determine if the packet 302 comprises any byte sequence signatures. If so, then the byte caching manager 118 extracts these signatures for data object reconstruction, in a known manner. The byte caching manager 118 then performs a similar process as that performed by the server gateway system 108, discussed above with respect to FIG. 3.

Figure 5:
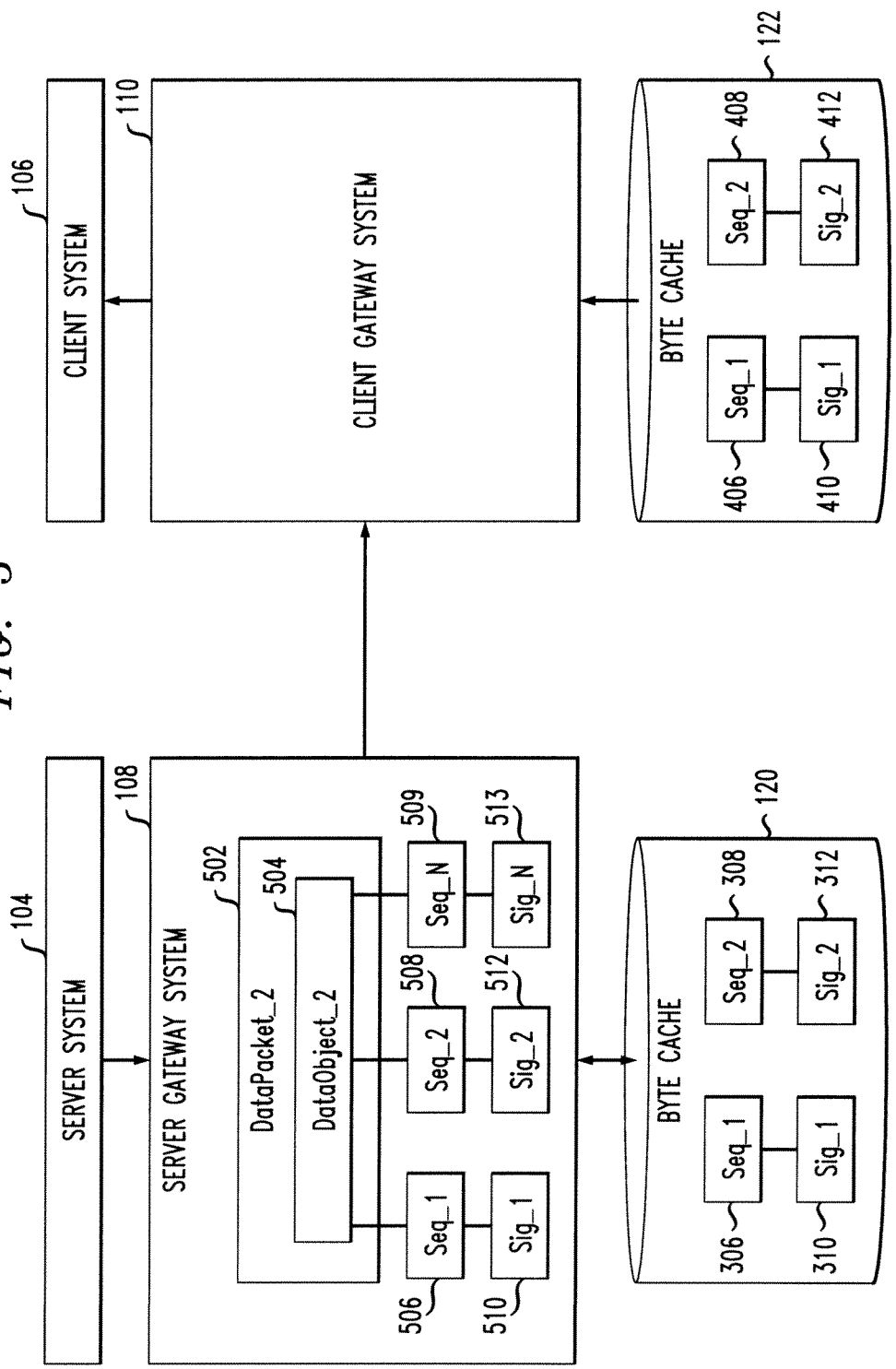

For example, the byte caching manager 118 of the client gateway system 110 analyzes/inspects the payload of the packet 302 to determine the object type of the data object(s) 304 within the payload. Based on the identified object type, the byte caching manager 118 performs one or more sequencing operations, which are specific to the identified object type, on the data object 304. Thus, the data object 304 is partitioned into a plurality of byte sequences 406, 408 (which are the same as byte sequences 306, 308). The byte caching manager 118 also calculates a signature 410, 412 for each of these byte sequences 406, 408, as discussed above. The byte caching manager 118 then stores the byte sequences 406, 408 and signatures 410, 412 in the byte cache 122, as shown in FIG. 5, and sends the data packet 302 to client system 106. It should be noted that, in one embodiment, the server gateway system 108 can transmit the byte sequences and their signatures within the data packet so that the byte caching manager 118 does not have to create them. In this embodiment, the byte caching manager 118 analyzes the byte cache 122 to determine if it includes any matching byte sequences and/or signatures.

FIG. 5 shows that the gateway server system 108 has received another data packet 502, DataPacket_2, from the server system 104. In response to receiving this data packet 502, the byte caching manager 116 performs a similar process to that discussed above with respect to FIG. 3. For example, the byte caching manager 116 analyzes/inspects the payload of the packet 502 to determine the object type of the data object(s) 504 within the payload. Based on the identified object type, the byte caching manager 116 performs one or more sequencing operations that are specific to the identified object type, on the data object 504. Thus, the data object 504 is partitioned into a plurality of byte sequences 506, 508, 509.

The byte caching manager 116 also calculates a signature 510, 512, 513 for each of these byte sequences 506, 508, 509, as discussed above.

The byte caching manager 116 then compares the byte sequences 506, 508, 509 and/or the signatures 510, 512, 513 to the sequences and/or signatures within the byte cache 120, as discussed above. In the example shown in FIG. 5, the byte caching manager 116 determines that a match (Seq_1 306) for byte sequence Seq_1 506 byte sequence and a match (Seq_2 308) for Seq_2 exist within the byte cache 120. The byte caching manager 116 also determines that a match does not exist within the byte cache 120 for Seq_N 509. The byte caching manager 116 stores byte sequence Seq_N 509 and its signature Sig_N 513 within the byte cache 120. The byte caching manager 116 encodes the data packet 502 with the signatures Sig_1 310 and Sig_2 312 for sequence Seq_1 506 and Seq_2 508 along with the byte sequence Seq_N 509. It should be noted that Sig_1 310 is the same as Sig_510 and Sig_2 312 is the same as Sig_512.

Figure 6:
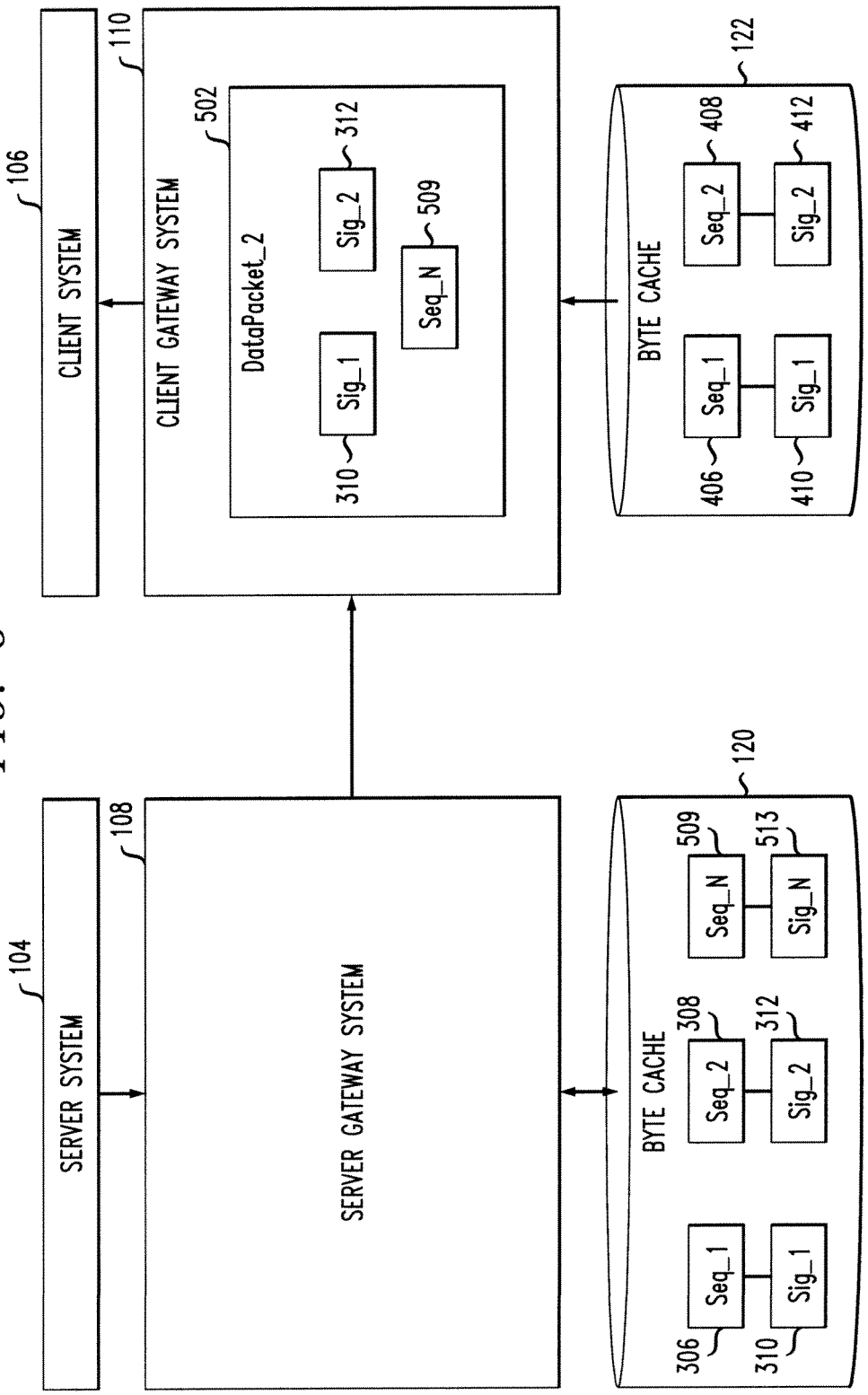

This encoded data packet 502 is then sent to the client gateway system 110, as shown in FIG. 6. In other words, because the server gateway system 108 and client gateway system 110 have previously received DataObject_1 304, the server gateway system 108 only needs to send the signatures associated with byte sequences of DataObject_1. The byte cache 122 of the client gateway system 110 already comprises the byte sequences 406, 408 corresponding to DataObject_1 304. The byte sequence Seq_N 509 is sent to the client gateway system 110 since the byte cache 122 of the byte caching manager 116 does not comprise a corresponding byte sequence.

The client gateway system 110 receives the data packet 502 as shown in FIG. 6 and performs a process similar to that discussed above with respect to FIGS. 3 and 4. For example, the byte caching manager 118 of the client gateway system 110 extracts the signatures Sig_1 310 and Sig_2 312 from the packet 502. The byte caching manager 118 utilizes these signatures to find the corresponding byte sequences Seq_1 406 and Seq_2 408 within the byte cache 122. The byte caching manager 118 also generates the byte sequence and signature for byte sequence Seq_N 509 that is within the packet 502. This byte sequence and signature are then stored within the byte cache 122. The client gateway system 110 then reconstructs the packet using the retrieved byte sequences along with the byte sequence that was within the packet and sends the reconstructed packet to the client system 106.

Figure 7:
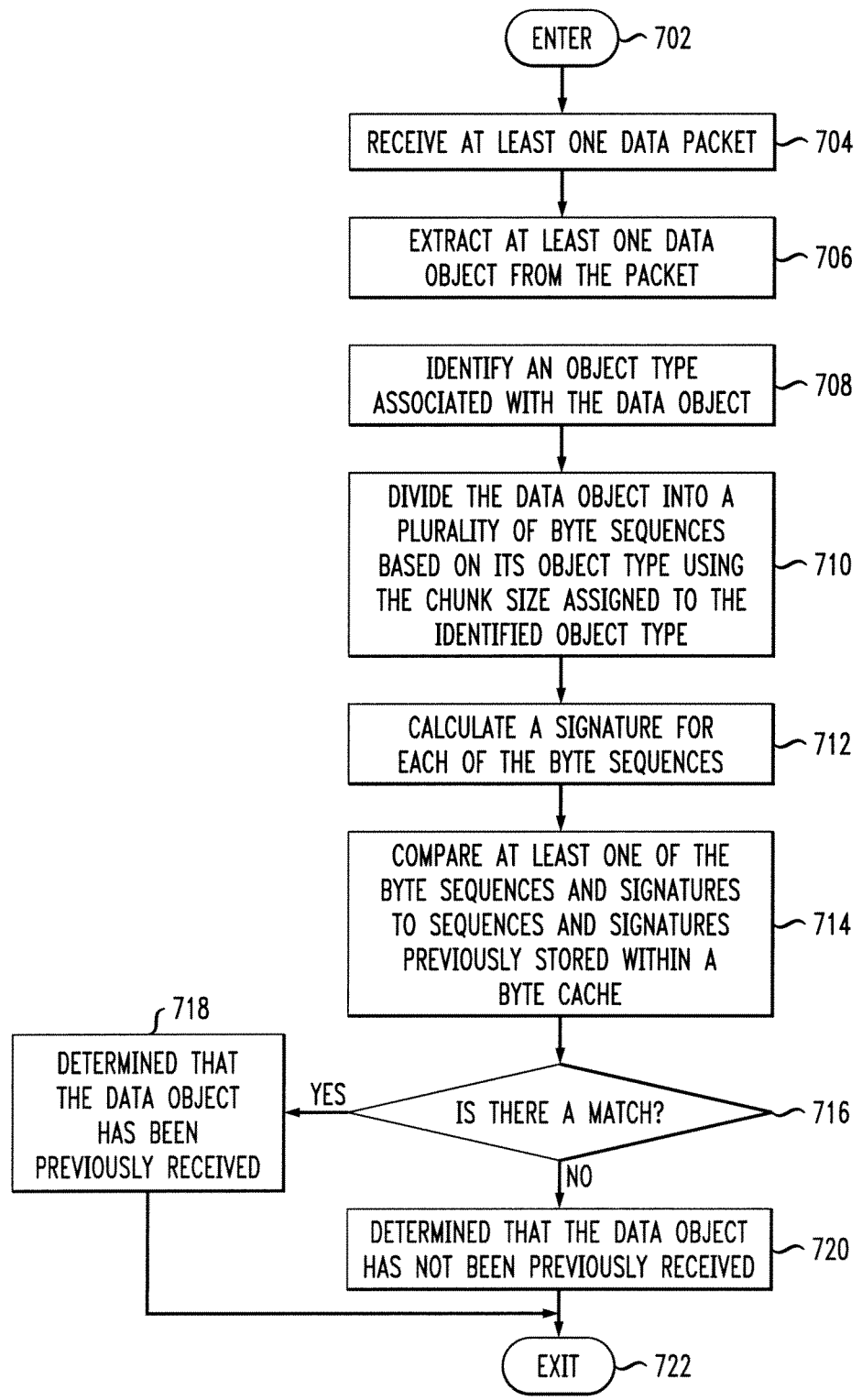
FIG. 7 is an operational flow diagram illustrating one example of an overall process for object type away byte caching according to one embodiment of the present invention.

FIG. 7 shows an operational flow diagram illustrating one example of byte caching. It should be noted that the steps of the operation flow diagram shown in FIG. 7 have already been discussed above in greater detail. The operational flow diagram of FIG. 7 begins at step 702 and flows directly to step 704. The byte caching manager 116, at step 704, receives at least one data packet. The byte caching manager 116, at step 706, extracts at least one data object from the packet. The byte caching manager 116, at step 708, identifies an object type associated with the data object.

The byte caching manager 116, at step 710, divides the data object into a plurality of byte sequences based on its object type, using the chunk size assigned to the determined object type. The byte caching manager 116, at step 712, calculates a signature for each of the byte sequences. The byte caching manager 116, at step 714, compares at least one of the byte sequences and signatures to sequences and signatures that have been previously stored within a byte cache 120. The byte caching manager 116, at step 716, determines if there is a match. If so, the byte caching manager 116, at step 718, determines that the data object has been previously received and does not store the sequences/signatures within the byte cache 116. When sending the packet to its destination the byte caching manager 116 only places the signatures of the byte sequences within the data packet as compared to the byte sequences themselves, as discussed above. The control flow then exits at step 722. If a match does not exist, the byte caching manager 116, at step 720, determines that the data object has not been previously received and does stores the sequences/signatures within the byte cache 116. When sending the packet to its destination the byte caching manager 116 places the byte sequences within the data packet, as discussed above. The control flow then exits at step 722.

Figure 8:
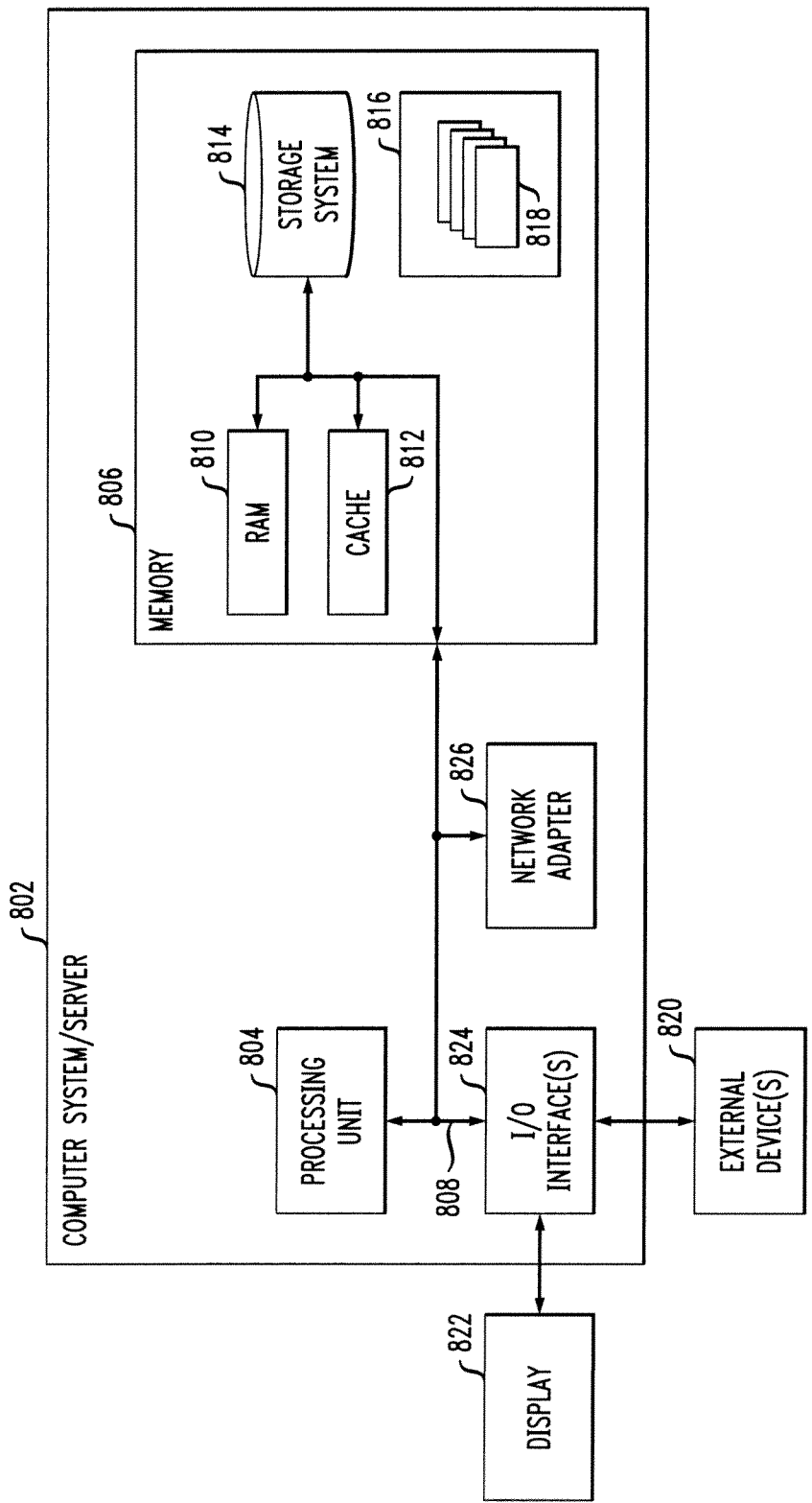
FIG. 8 illustrates one example of an information processing system according to one embodiment of the present invention.

Referring now to FIG. 8, a schematic of an example of an information processing system, such as the gateway systems 108, 110 of FIG. 1, is shown. Information processing system 802 is only one example of a suitable system and is not intended to suggest any limitation as to the scope of use or functionality of embodiments of the invention described herein. Regardless, the information processing system 802 is capable of being implemented and/or performing any of the functionality set forth hereinabove.

The information processing system 802 can be a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 8, the information processing system 802 is shown in the form of a general-purpose computing device. The components of the information processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 802 typically includes a variety of computer system readable media. Such media may be any available media that is accessible by the information processing system 802, and it includes both volatile and non-volatile media, removable and non-removable media.

Although not shown, the system memory 806, in one embodiment, comprises the packet manager 112, the byte caching manager 116, the byte cache 120, and the sequencing profiles 220, as shown in FIG. 2. These one or more components can also be implemented in hardware as well. The system memory 806 can include computer system readable media in the form of volatile memory, such as random access memory (RAM) 1010 and/or cache memory 812. The information processing system 802 can further include other removable/non-removable, volatile/non-volatile computer system storage media. By way of example only, a storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. As will be further depicted and described below, the memory 806 may include at least one program product having a set (e.g., at least one) of program modules that are configured to carry out the functions of various embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the invention as described herein.

The information processing system 802 can also communicate with one or more external devices 820 such as a keyboard, a pointing device, a display 822, etc.; one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. It should be understood that although not shown, other hardware and/or software components could be used in conjunction with the information processing system 802. Examples, include, but are not limited to: microcode, device drivers, redundant processing units, external disk drive arrays, RAID systems, tape drives, and data archival storage systems, etc.

While FIG. 7 shows an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A method for performing byte caching, the method comprising:

receiving at least one data packet from at least one network node;

extracting at least one data object from the at least one data packet;

identifying an object type associated with the at least one data packet;

determining a chunk size associated with the object type based on one or more network conditions;

storing at least a portion of said at least one data packet in a byte cache based on said determined chunk size; and wherein the object type is determined to be one or more of an image object type and a video object type, and wherein for said image object type the at least one data object is divided by dividing the at least one data object into two byte sequences of equal length and wherein for said video object type the at least one data object is divided by dividing the at least one data object into byte sequences at boundaries between each intra-coded picture frame (I-frame) of the data object.

2. The method of claim 1, further comprising:
calculating a signature for each byte sequence in a plurality of byte sequences; and
storing at least one of the signatures in the byte cache.

3. The method of claim 1, wherein said at least a portion of said at least one data packet comprises at least one byte sequence and wherein said storing said at least a portion of said at least one data packet into the byte cache comprises:
comparing the at least one byte sequence to one or more byte sequences previously stored within the byte cache; and
responsive to the one or more byte sequences failing to match the at least one byte sequence, storing the at least one byte sequence in the byte cache.

4. The method of claim 3, wherein comparing the at least one byte sequence to one or more byte sequences previously stored within the byte cache comprises:
comparing, for each byte sequence in the at least one byte sequence, a signature associated with the at least one byte sequence to one or more signatures previously stored within the byte cache.

5. The method of claim 1, wherein said at least a portion of said at least one data packet comprises at least one byte sequence and wherein said storing said at least a portion of said at least one data packet into the byte cache further comprises:
determining that the byte cache comprises at least one other byte sequence in a plurality of byte sequences, wherein the at least one other byte sequence has been previously stored within the byte cache; and
sending, in response to the determining, a data packet to at least one networking node comprising:
a signature representing the at least one other byte sequence, and
each remaining byte sequence in the plurality of byte sequences.

6. The method of claim 1, wherein said step of determining a chunk size associated with the object type further comprises the step of evaluating one or more additional criteria.

7. The method of claim 6, wherein said one or more additional criteria comprises one or more of object size, cache-control headers, a static degree of said at least one data object and a popularity of said at least one data object.

8. A system for performing byte caching, comprising:
a memory; and
at least one hardware device, coupled to the memory, operative to:
receive at least one data packet from at least one network node;
extract at least one data object from the at least one data packet;
identify an object type associated with the at least one data packet;
determine a chunk size associated with the object type based on one or more network conditions;
store at least a portion of said at least one data packet in a byte cache based on said determined chunk size; and
wherein the object type is determined to be one or more of an image object type and a video object type, and wherein for said image object type the at least one data object is divided by dividing the at least one data object into two byte sequences of equal length and wherein for said video object type the at least one data object is divided by dividing the at least one data object into byte sequences at boundaries between each intra-coded picture frame (I-frame) of the data object.

9. The system of claim 8, wherein said at least one hardware device is further configured to:
calculate a signature for each byte sequence in a plurality of byte sequences; and
store at least one of the signatures in the byte cache.

10. The system of claim 8, wherein said at least a portion of said at least one data packet comprises at least one byte sequence and wherein storing said at least a portion of said at least one data packet into the byte cache comprises:
comparing the at least one byte sequence to one or more byte sequences previously stored within the byte cache; and
responsive to the one or more byte sequences failing to match the at least one byte sequence, storing the at least one byte sequence in the byte cache.

11. The system of claim 10, wherein comparing the at least one byte sequence to one or more byte sequences previously stored within the byte cache comprises:
comparing, for each byte sequence in the at least one byte sequence, a signature associated with the at least one byte sequence to one or more signatures previously stored within the byte cache.

12. The system of claim 8, wherein said at least a portion of said at least one data packet comprises at least one byte sequence and wherein said at least one hardware device is further configured to:
determine that the byte cache comprises at least one other byte sequence in a plurality of byte sequences, wherein the at least one other byte sequence has been previously stored within the byte cache; and
send, in response to the determination, a data packet to at least one networking node comprising:
a signature representing the at least one other byte sequence, and
each remaining byte sequence in the plurality of byte sequences.

13. The system of claim 8, wherein said chunk size associated with the object type is determined by evaluating one or more additional criteria, wherein said one or more additional criteria comprises one or more of object size, cache-control headers, a static degree of said at least one data object and a popularity of said at least one data object.

14. An article of manufacture for performing byte caching, comprising a tangible machine readable recordable medium containing one or more programs which when executed implement the steps of:
receiving at least one data packet from at least one network node;
extracting at least one data object from the at least one data packet;
identifying an object type associated with the at least one data packet;
determining a chunk size associated with the object type based on one or more network conditions;
storing at least a portion of said at least one data packet in a byte cache based on said determined chunk size; and
wherein the object type is determined to be one or more of an image object type and a video object type, and wherein for said image object type the at least one data object is divided by dividing the at least one data object into two byte sequences of equal length and wherein for said video object type the at least one data object is divided by dividing the at least one data object into byte sequences at boundaries between each intra-coded picture frame (I-frame) of the data object.

15. The article of manufacture of claim 14, wherein said step of determining a chunk size associated with the object type further comprises the step of evaluating one or more additional criteria.

16. The article of manufacture of claim 15, wherein said one or more additional criteria comprises one or more of object size, cache-control headers, a static degree of said at least one data object and a popularity of said at least one data object.

17. A system for performing byte caching, comprising:
a memory; and
at least one hardware device, coupled to the memory, operative to:
receive at least one data packet from at least one network node;
extract at least one data object from the at least one data packet;
identify an object type associated with the at least one data packet;
determine a chunk size associated with the object type; and
store at least a portion of said at least one data packet in a byte cache based on said determined chunk size, wherein the object type is determined to be an image object type, and wherein the at least one data object is divided by dividing the at least one data object into two byte sequences of equal length.

18. A system for performing byte caching, comprising:
a memory; and
at least one hardware device, coupled to the memory, operative to:
receive at least one data packet from at least one network node;
extract at least one data object from the at least one data packet;
identify an object type associated with the at least one data packet;
determine a chunk size associated with the object type; and
store at least a portion of said at least one data packet in a byte cache based on said determined chunk size, wherein the object type is determined to be a video object type, and wherein the at least one data object is divided by dividing the at least one data object into byte sequences at boundaries between each intra-coded picture frame (I-frame) of the data object.

* * * * *